(12) United States Patent
Wada et al.

(10) Patent No.: US 8,520,313 B2
(45) Date of Patent: Aug. 27, 2013

(54) ZOOM LENS AND IMAGE PICKUP DEVICE INCLUDING THE SAME

(75) Inventors: Ken Wada, Sakura (JP); Yoshihisa Tashiro, Nikko (JP); Tsunefumi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 12/904,963

(22) Filed: Oct. 14, 2010

(65) Prior Publication Data
US 2011/0090571 A1 Apr. 21, 2011

(30) Foreign Application Priority Data
Oct. 19, 2009 (WO) .................. PCT/JP2009/068035

(51) Int. Cl.
*G02B 15/00* (2006.01)
*G02B 1/06* (2006.01)

(52) U.S. Cl.
USPC .......................................... 359/676; 359/665

(58) Field of Classification Search
USPC .................. 359/665–667, 676–694
See application file for complete search history.

(56) References Cited

U.S. PATENT DOCUMENTS

| 4,407,567 | A | * | 10/1983 | Michelet et al. | 359/666 |
|---|---|---|---|---|---|
| 7,209,297 | B2 | * | 4/2007 | Chen et al. | 359/676 |
| 7,317,580 | B2 | * | 1/2008 | Kogo et al. | 359/676 |
| 7,855,838 | B2 | * | 12/2010 | Jannard et al. | 359/665 |
| 2011/0002043 | A1 | * | 1/2011 | Seo et al. | 359/666 |

FOREIGN PATENT DOCUMENTS

| JP | 62-24210 A | 2/1987 |
|---|---|---|
| JP | 63-208818 A | 8/1988 |
| JP | 2006-098972 A | 4/2006 |
| JP | 2008-203650 A | 9/2008 |
| WO | 2008-102894 A1 | 8/2008 |

* cited by examiner

*Primary Examiner* — Darryl J Collins
(74) *Attorney, Agent, or Firm* — Canon U.S.A., Inc. IP Division

(57) ABSTRACT

A zoom lens includes, a plurality of lens units arranged along an optical axis and configured to move from a wide angle end to a telephoto end during a zooming operation of the zoom lens; a first refractive power variable element whose refractive power is changed in a positive direction by changing shapes of boundary surfaces of different media when zooming from the wide-angle end to the telephoto end; and a second refractive power variable element whose refractive power is changed in a negative direction by changing shapes of boundary surfaces of different media when zooming from the wide-angle end to the telephoto end. When zooming from the wide-angle end to the telephoto end, imaging magnifications of the first refractive power variable element and the second refractive power variable element are increased.

8 Claims, 14 Drawing Sheets

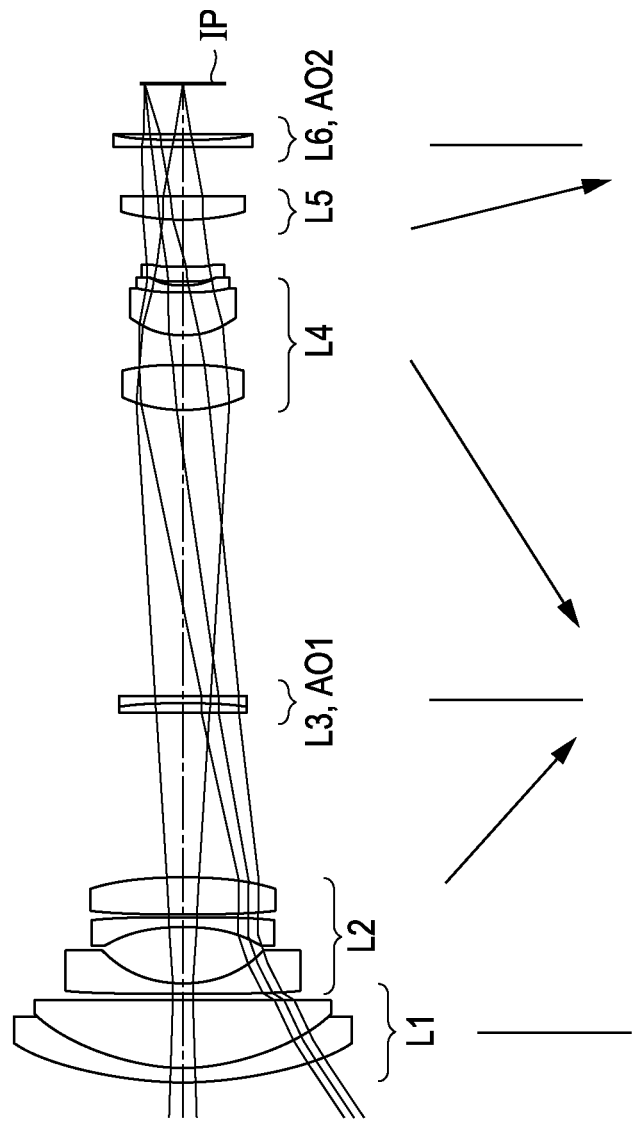

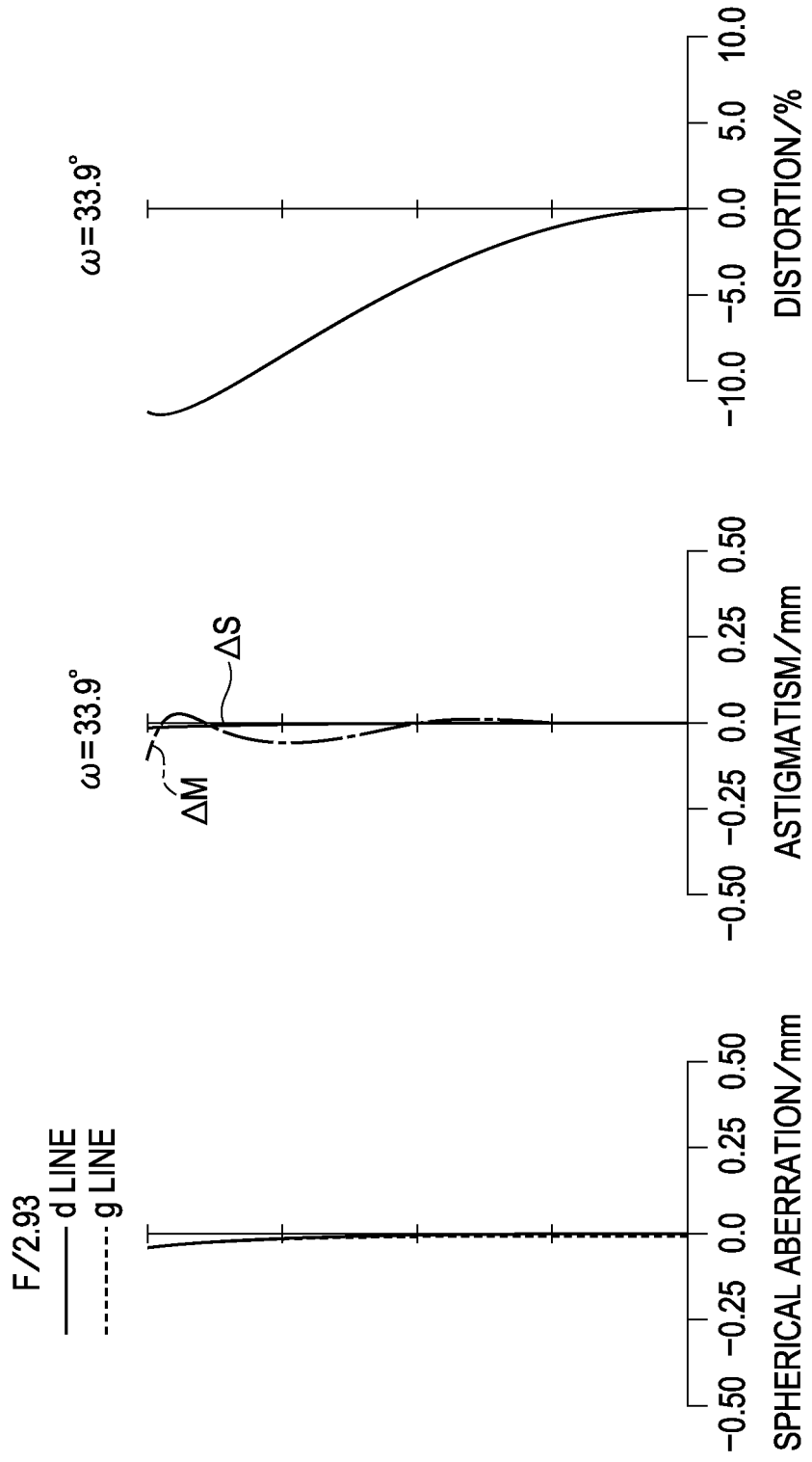

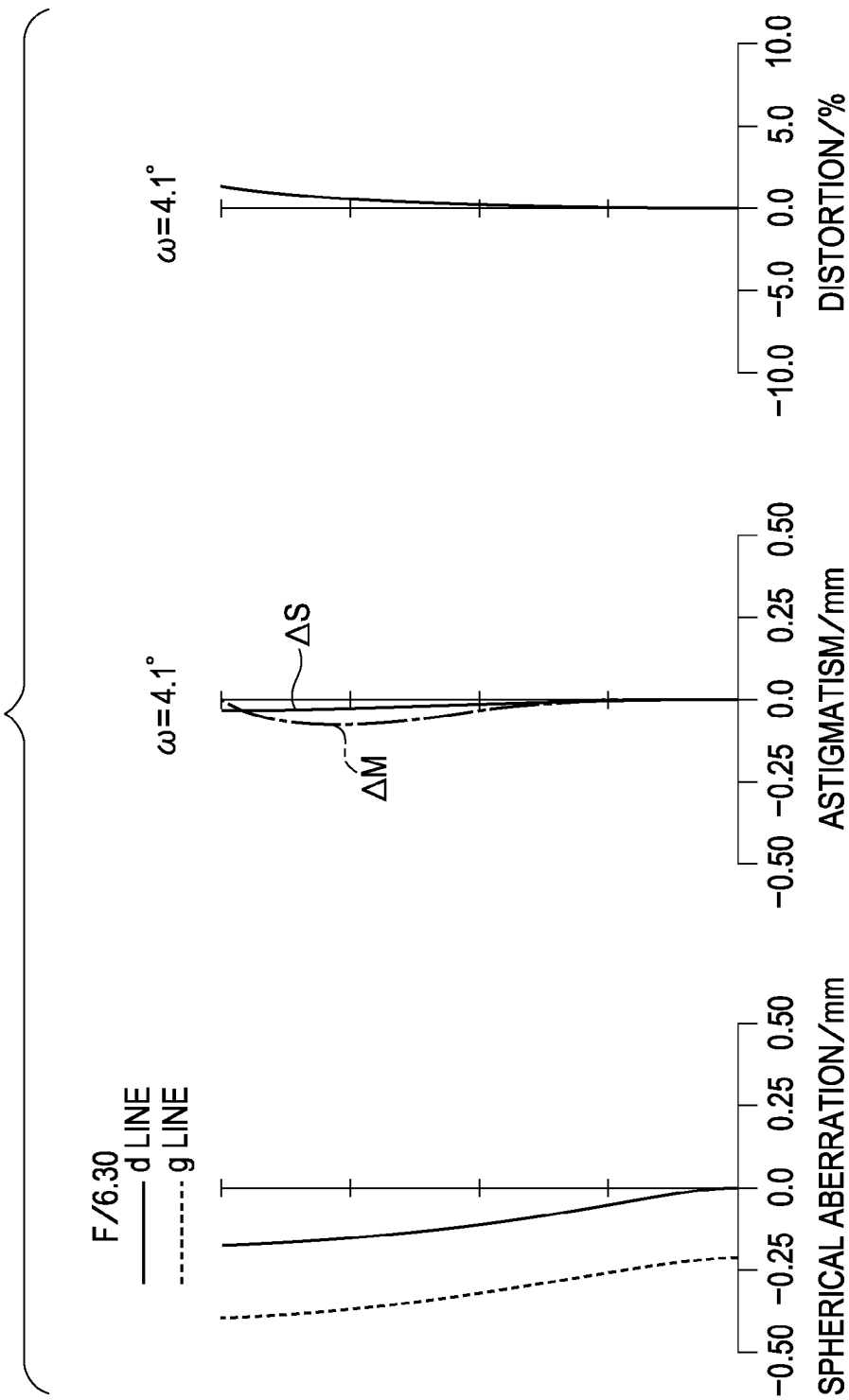

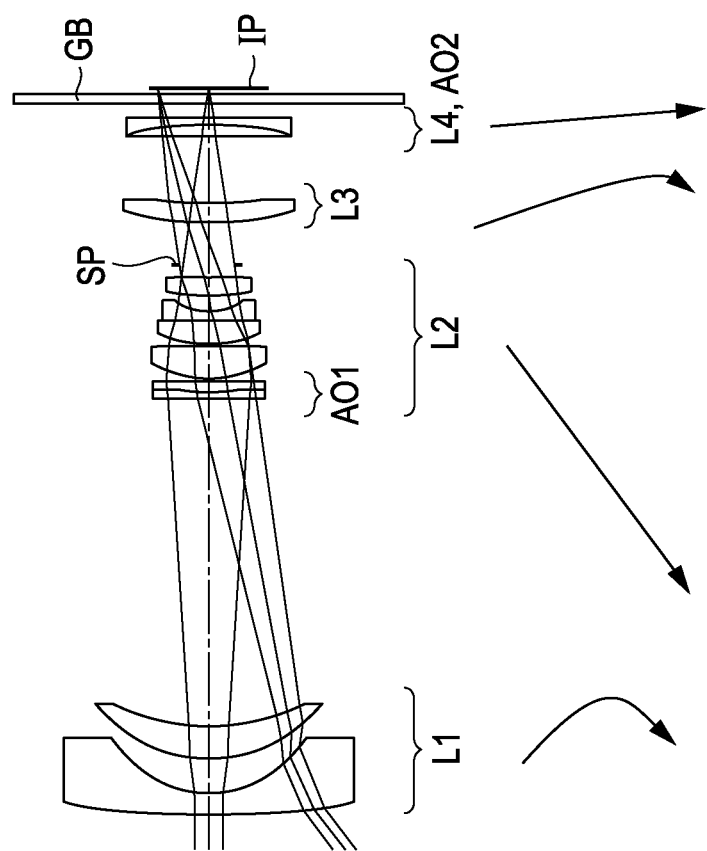

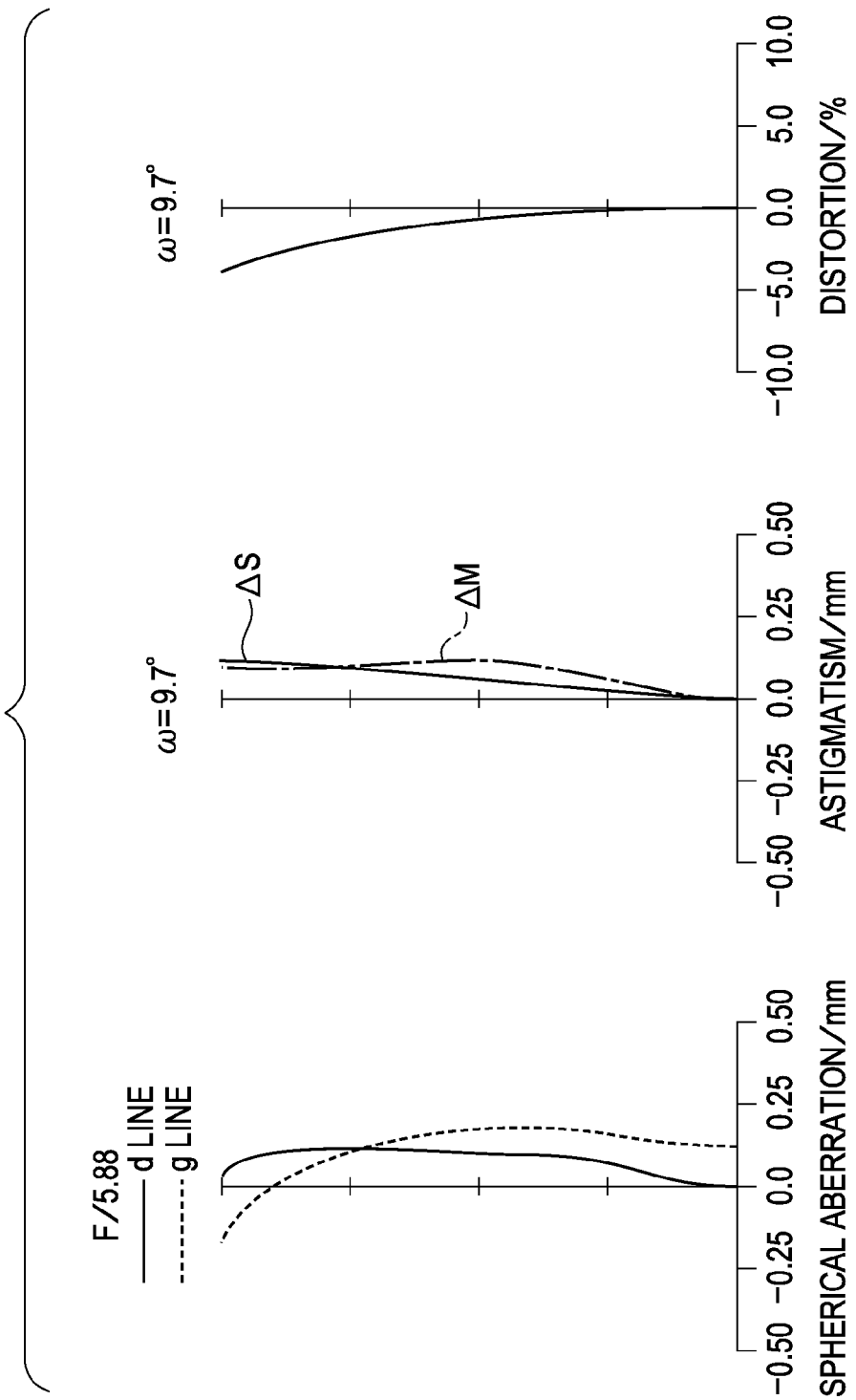

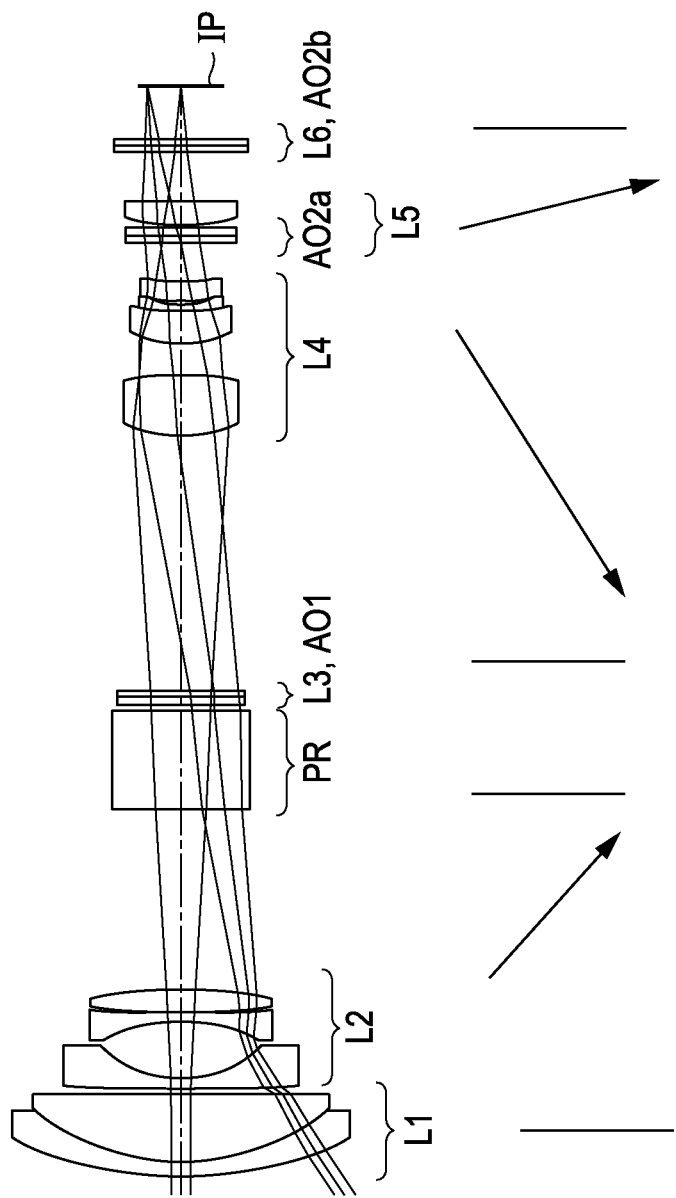

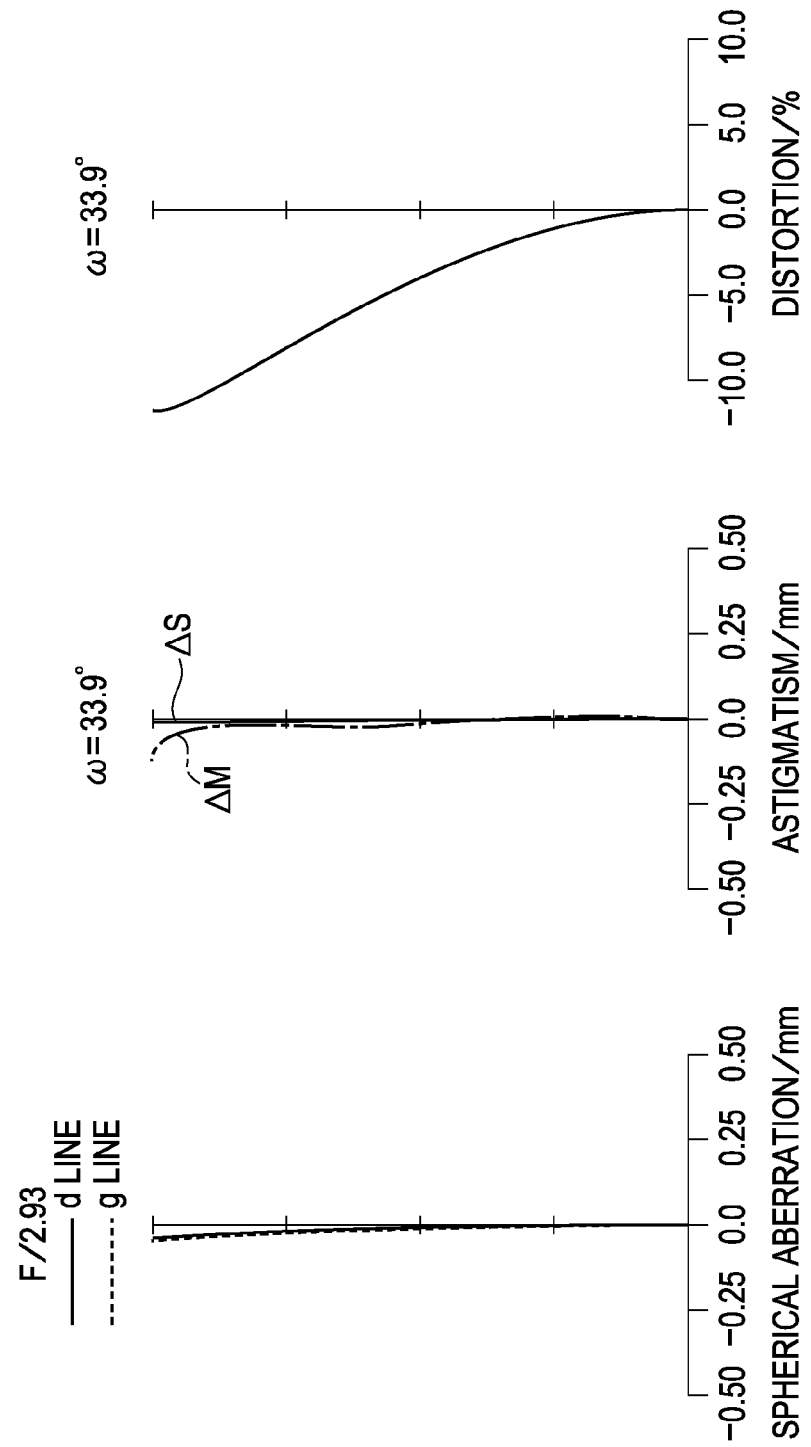

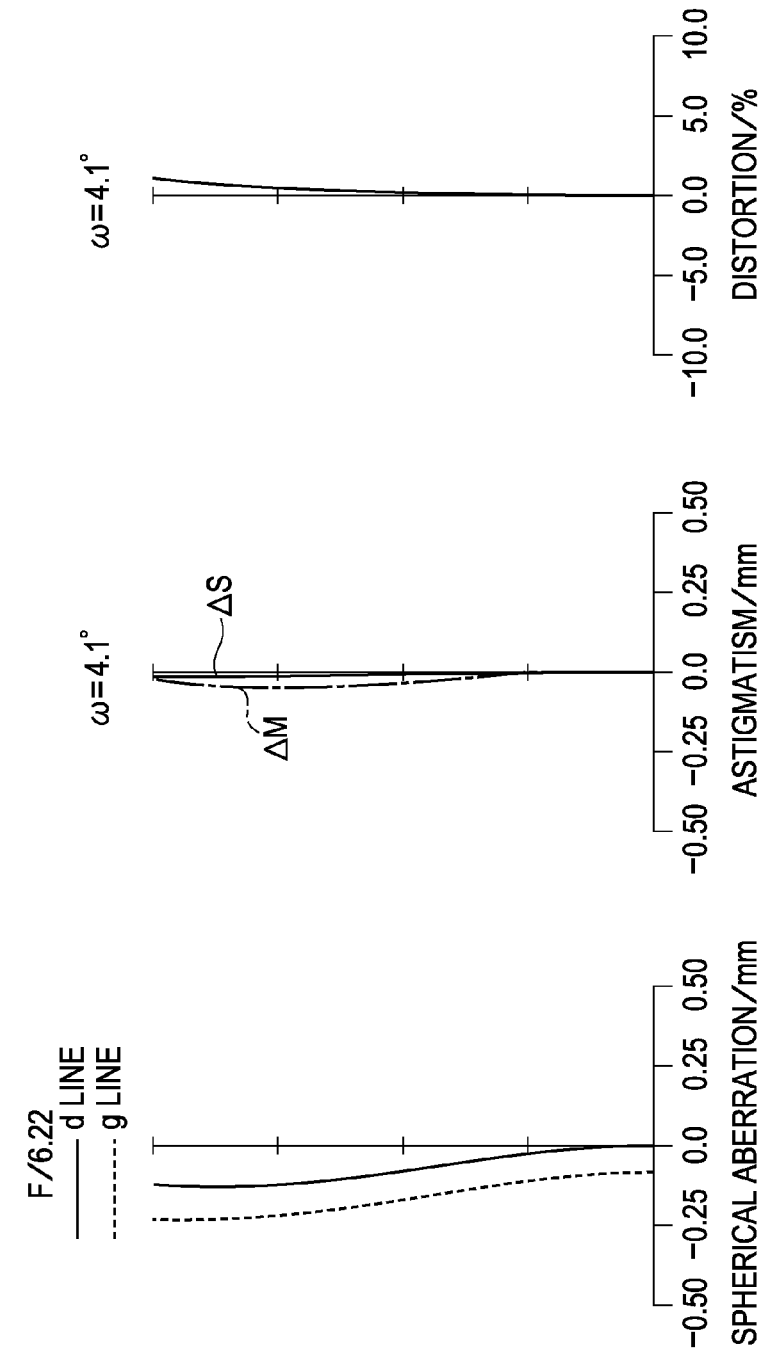

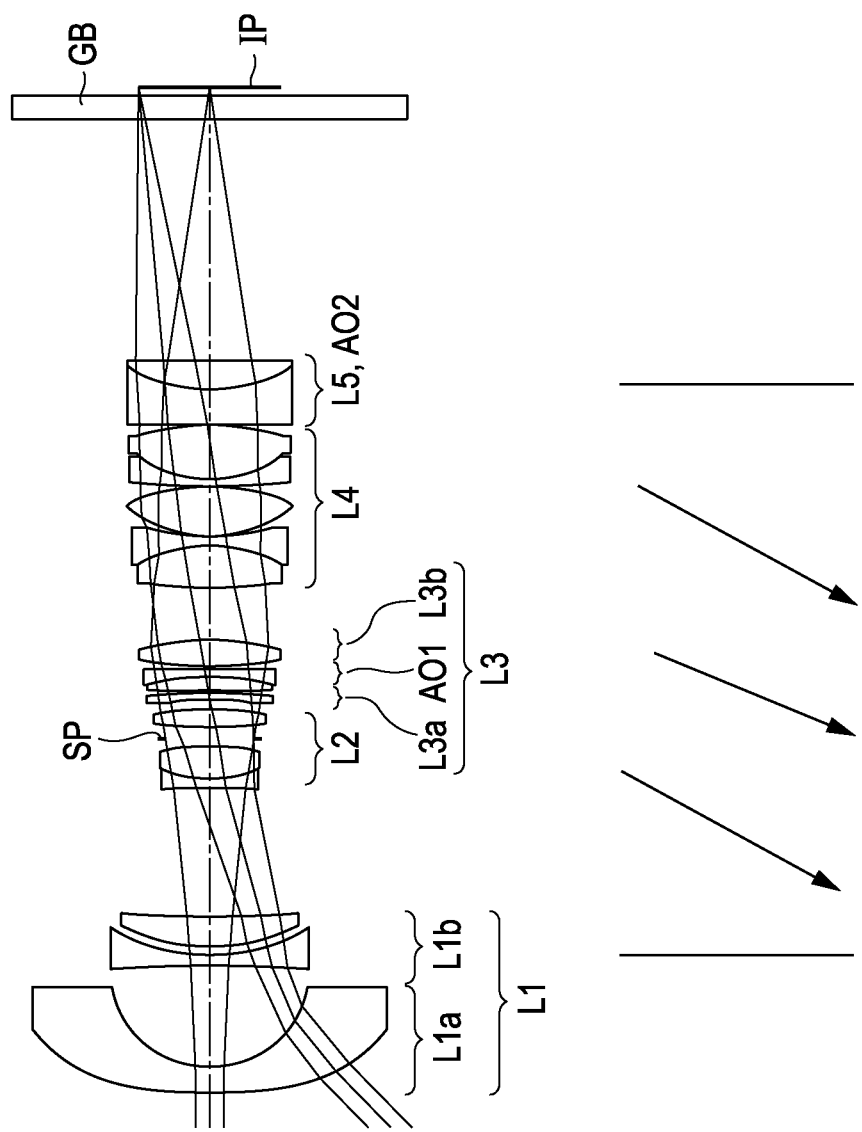

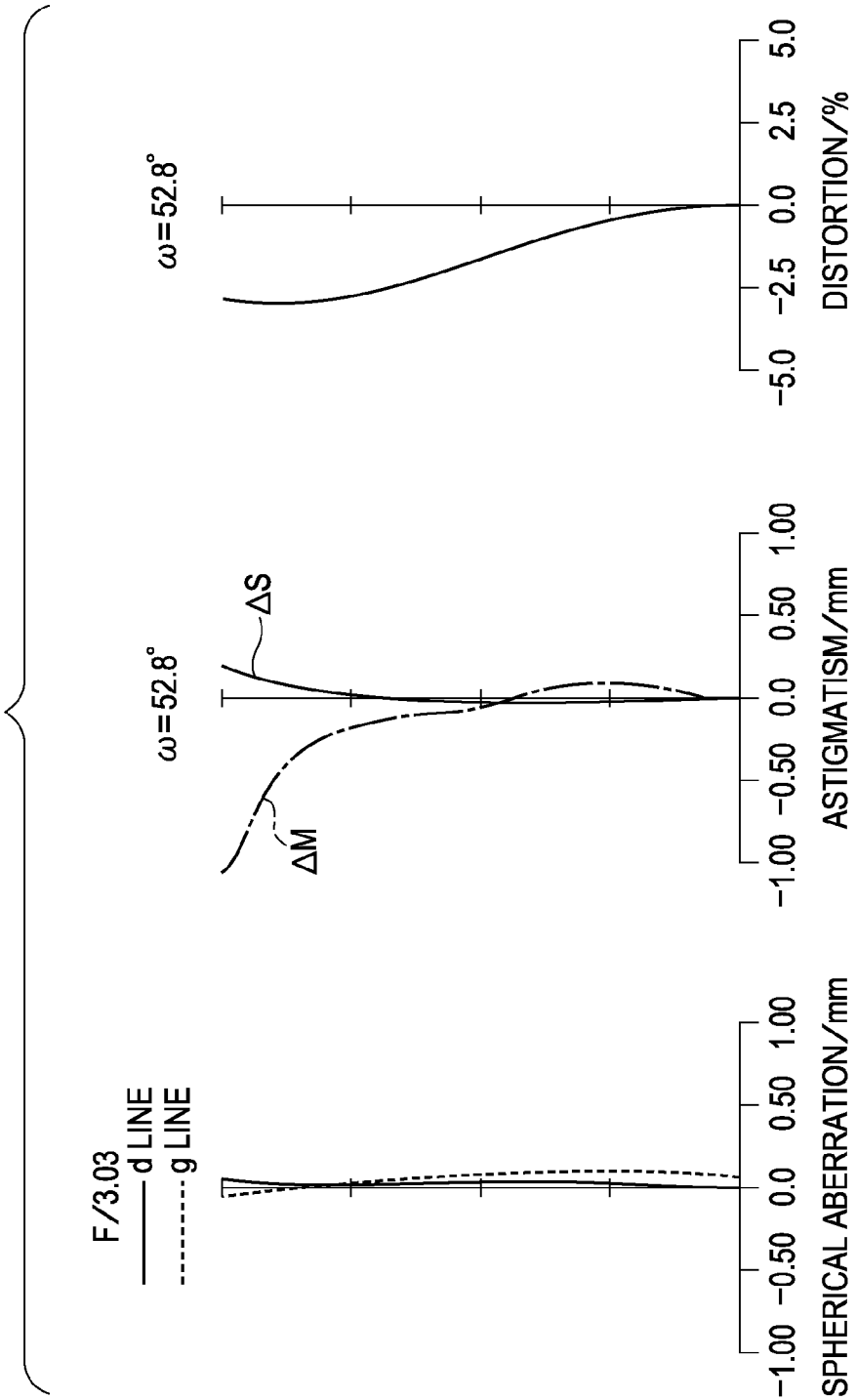

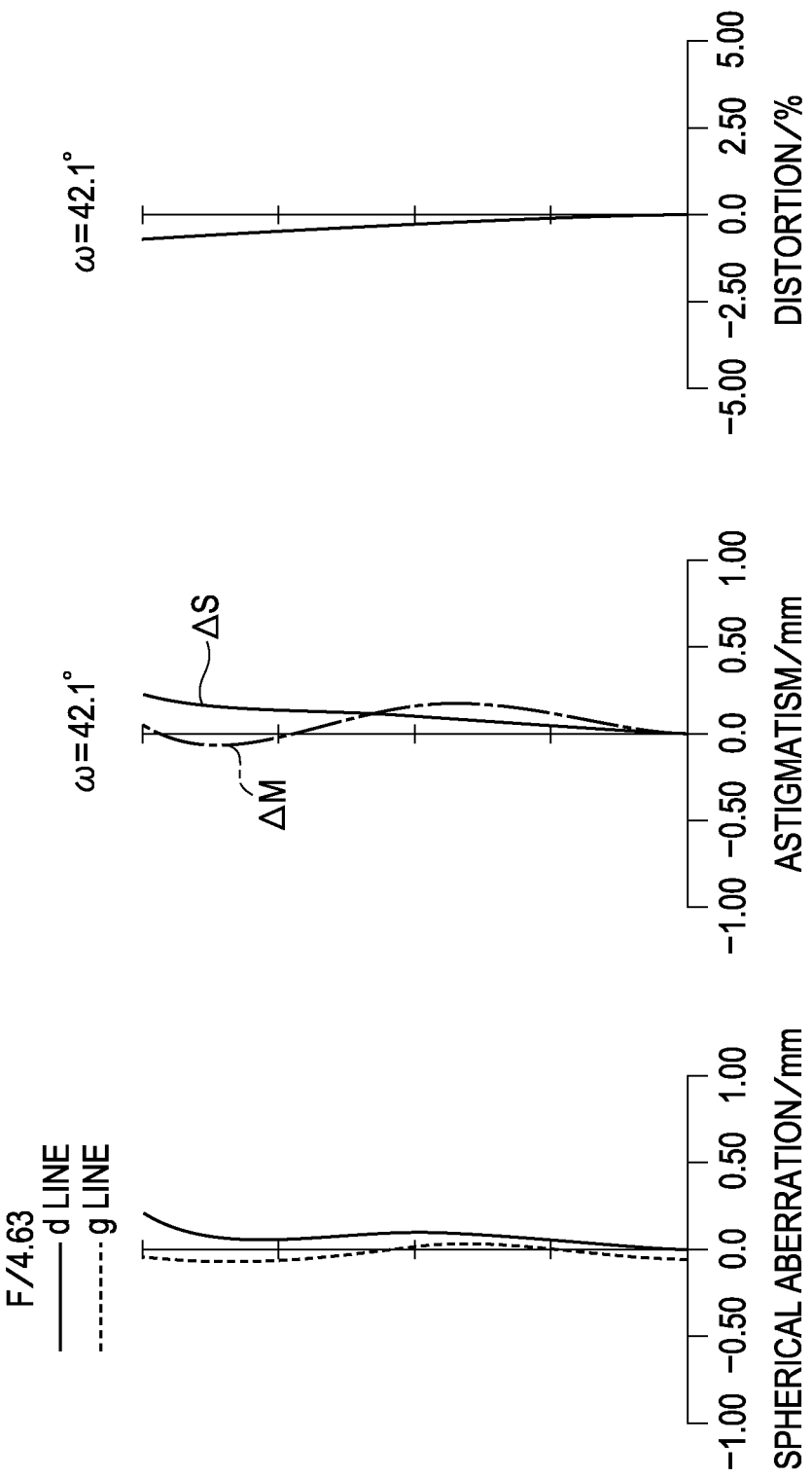

ZOOM LENS AND IMAGE PICKUP DEVICE INCLUDING THE SAME

TECHNICAL FIELD

The present invention relates to a zoom lens including a refractive power variable optical element. The zoom lens according to the present invention is suitable for use, for example, an image taking lens of a digital imaging camera.

BACKGROUND ART

Hitherto, an optical element which can change a refractive power by changing a curvature of an interface between two types of liquids has been known.

FIG. 9A shows a refractive power variable element 100 making use of two types of liquids that do not mix with each other. A curvature of an interface between an electrolyte 103 and a non-electrolyte 104 can be changed by adjusting a contact angle of the liquids as a result of applying a voltage to electrodes 101 and 102 disposed at peripheral portions of the interface.

FIG. 9B shows a refractive power variable element 200 including a resilient film 203 between two types of liquids 201 and 202. A refractive power can be changed by deforming the resilient film 203 with driving means 204 such as an actuator. According to such a refractive power variable element 200, for the two types of liquids 201 and 202, liquids that tend to mix with each other may be selected.

A zoom lens making use of a refractive power variable element such as that described above is known. In zoom lenses in PTL 1 and PTL 2, a refractive power variable element is used to reduce the amount of movement of each lens unit when zooming, thereby reducing an overall lens length.

CITATION LIST

Patent Literature

PTL 1: Japanese Patent Laid-Open No. 2006-98972
PTL 2: Japanese Patent Laid-Open No. 62-24210

Each of the PTLs 1 and 2 discusses a zoom lens having a certain zoom ratio, but does not take into account variations in optical performance that occur when zooming.

If a curvature, that is, a refractive power when zooming of a refractive power variable element is not properly changed, variations in curvature of field caused by zooming is increased and a high zoom ratio is difficult to achieve.

SUMMARY OF INVENTION

It is an object of the present invention to provide a zoom lens having a high zoom ratio and having reduced variations in curvature of field resulting from zooming.

A zoom lens according to the present invention includes, a plurality of lens units arranged along an optical axis and configured to move from a wide angle end to a telephoto end during a zooming operation of the zoom lens, a first refractive power variable element whose refractive power is changed in a positive direction by changing shapes of boundary surfaces of different media when zooming from the wide angle end to the telephoto end, and a second refractive power variable element whose refractive power is changed in a negative direction by changing shapes of boundary surfaces of different media when zooming from the wide angle end to the telephoto end. When zooming from the wide angle end to the telephoto end, imaging magnifications of the first refractive power variable element and the second refractive power variable element are increased.

Further features of the present invention will become apparent to persons having ordinary skill in the art from the following description of exemplary embodiments with reference to the attached drawings.

BRIEF DESCRIPTION OF DRAWINGS

FIG. 1 is a sectional view of a zoom lens according to a first embodiment of the present invention.

FIG. 2A shows aberrations of the zoom lens at the wide angle end according to the first embodiment of the present invention.

FIG. 2B shows aberrations of the zoom lens at the telephoto end according to the first embodiment of the present invention.

FIG. 3 is a sectional view of a zoom lens according to a second embodiment of the present invention.

FIG. 4B shows aberrations of the zoom lens at the telephoto end according to the second embodiment of the present invention.

FIG. 5 is a sectional view of a zoom lens according to a third embodiment of the present invention.

FIG. 6A shows aberrations of the zoom lens at the wide angle end according to the third embodiment of the present invention.

FIG. 6B shows aberrations of the zoom lens at the telephoto end according to the third embodiment of the present invention.

FIG. 7 is a sectional view of a zoom lens according to a fourth embodiment of the present invention.

FIG. 8A shows aberrations of the zoom lens at the wide angle end according to the fourth embodiment of the present invention.

FIG. 8B shows aberrations of the zoom lens at the telephoto end according to the fourth embodiment of the present invention.

DESCRIPTION OF EMBODIMENTS

Preferred embodiments of the present invention will hereunder be described in detail with reference to the attached drawings.

First, features common to all of the embodiments according to the present invention will be described for the sake of brevity. Subsequently, specific numerical examples corresponding to certain embodiments will be described in detail.

A zoom lens of each of the embodiments according to the present invention includes a plurality of lens units arranged along an optical axis in order from an object side to an image. At least part of the plurality of lens units move along the optical axis when zooming from a wide-angle end to a telephoto end. In addition, a first refractive power variable element AO1 whose refractive power (that is, a reciprocal of a focal length) is changed in a positive direction when zooming from the wide-angle end to the telephoto end, and a second refractive power variable element AO2 whose refractive power is changed in a negative direction when zooming from the wide-angle end to the telephoto end constitute at least some of the lens units.

Here, "refractive power is changed in a positive direction" means that a negative power of the refractive power variable element becomes small, or that the negative refractive power is changed to a positive refractive power, or that the positive refractive power becomes large. In addition, "refractive power is changed in a negative direction" means that "the negative refractive power of the refractive power variable element is increased," or that "the positive refractive power is changed to the negative refractive power" or that "the positive refractive power is reduced."

Figure 4A:
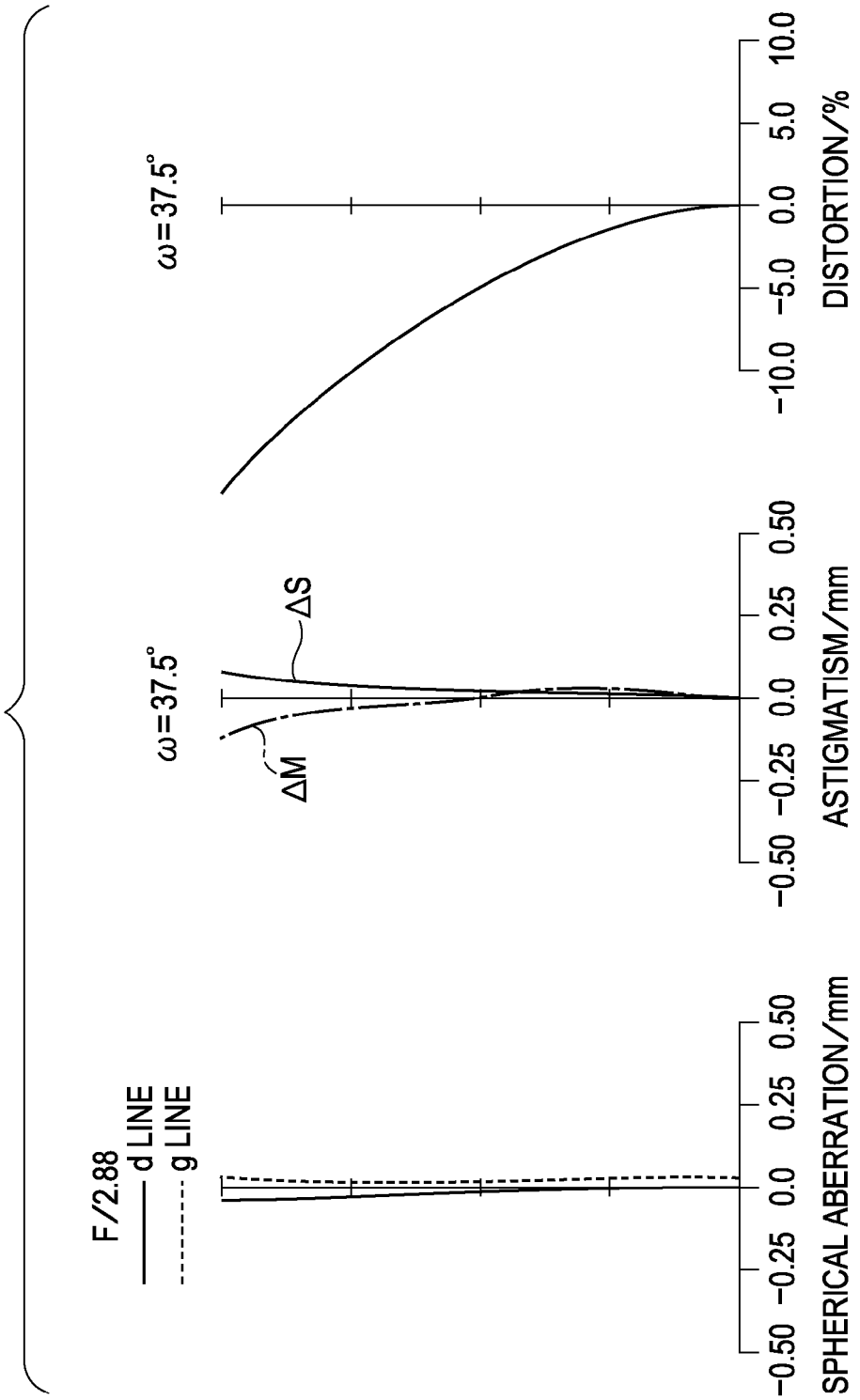
FIG. 4A shows aberrations of the zoom lens at the wide angle end according to the second embodiment of the present invention.
Figure 9A:
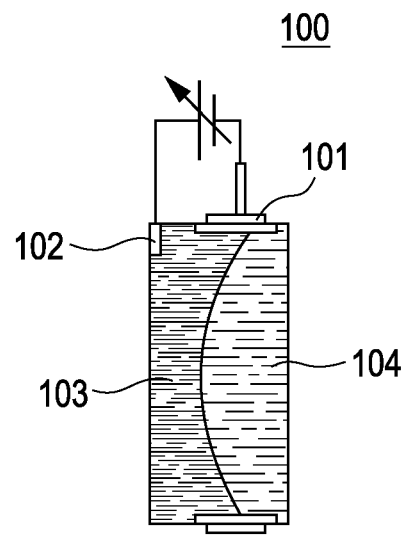
FIGS. 9A and 9B illustrate refractive power variable elements.
Figure 9B:
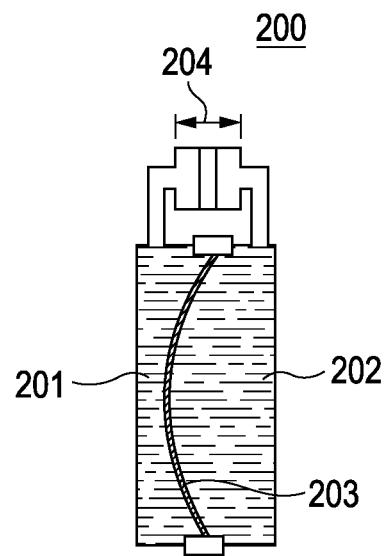

As each of the first refractive power variable element AO1 and the second refractive power variable element AO2, for example, as shown in FIGS. 9A and 9B, a refractive power variable element that can change the refractive power as a result of changing the shapes of boundary surfaces of different media may be used. When a refractive power variable element that can change the shapes of boundary surfaces of different media is used, an optical system is more easily reduced in size than when a zoom lens that performs zooming only by moving a plurality of lenses is used. However, as described in detail below, a zoom lens having reduced variations in aberrations and a zoom lens in which an imaging magnification of a refractive power variable element that can change the shapes of boundary surfaces of different media is further increased by moving the refractive power variable element when zooming are also included in the present invention. Further, although controlling of an interface between two types of liquids is illustrated in FIGS. 9A and 9B, an interface between one type of liquid and air may also be controlled. Still further, a refractive power variable element whose refractive power is changed by deforming a lens formed of, for example, a gel or a liquid may also be used.

SP denotes an aperture stop, and GB denotes a glass block. IP denotes an image plane. In a digital camera, a solid-state image pickup element, such as a CCD sensor or a CMOS, is disposed. In a silver halide camera, a silver halide film is disposed.

The wide-angle end and telephoto end are alternate zooming positions determined by a magnification-varying lens unit at both ends of a movable range thereof along an optical axis due to mechanical action.

In addition, when zooming from the wide-angle end to the telephoto end, imaging magnifications of the first refractive power variable element AO1 and the second refractive power variable element AO2 are increased. That is, in each of the refractive power variable elements, an absolute value |βt/βw| of a ratio between an imaging magnification βw at the wide-angle end and an imaging magnification βt at the telephoto end is greater than 1. The imaging magnification in the present invention refers to an imaging magnification at the d line wavelength when an object distance of an optical system is infinite.

Accordingly, a high zoom ratio can be achieved by increasing the imaging magnification of each refractive power variable element when zooming from the wide-angle end to the telephoto end.

Further, variations in curvature of field can be reduced by suitably changing the refractive powers of the first refractive power variable element AO1 and the second refractive power variable element AO2. That is, variations in the Petzval sum when zooming can be reduced by reversing the directions of the refractive powers of the first refractive power variable element AO1 and the second refractive power variable element AO2 when zooming from the wide-angle end to the telephoto end.

By virtue of the aforementioned characteristics, the advantages according to the present invention can be obtained. More specifically, if at least one of the following conditions is satisfied, more desirable structures can be achieved.

When zooming from the wide-angle end to the telephoto end, an amount of change of the refractive power of the first refractive power variable element AO1 whose refractive power changes in the positive direction is $\Delta\phi 1$, and an amount of change of the refractive power of the second refractive power variable element AO2 whose refractive power changes in the negative direction is $\Delta\phi 2$. Here, "an amount of change of the refractive power of the refractive power variable element when zooming from the wide-angle end to the telephoto end" refers to the difference between the refractive power at the telephoto end (reciprocal of a focal length) and the refractive power at the wide-angle end (reciprocal of a focal length). When there are a plurality of the first refractive power variable elements AO1 or the second refractive power variable elements AO2, the sum of the amounts of changes of refractive powers of the first refractive power variable elements AO1 is $\Delta\phi 1$, and the sum of the amounts of changes of refractive powers of the second refractive power variable elements AO2 is $\Delta\phi 2$. In addition, focal lengths of the entire zoom lens at the wide-angle end and the telephoto end are fw and ft, respectively. Here, the following conditional expression is satisfied:

$$0<|\Delta\phi 1+\Delta\phi 2|\cdot\sqrt{(fw\cdot ft)}<0.15 \quad (1)$$

Conditional Expression (1) refers to the amounts of changes of the refractive powers of the first refractive power variable element AO1 and the second refractive power variable element AO2 when zooming from the wide-angle end to the telephoto end. If the upper limit is exceeded, a residual field of curvature tends to increase.

When a plurality of the first refractive power variable elements AO1 are provided, the amount of change of the refractive power of a first refractive power variable element AO1min having the smallest amount of change in the refractive power when zooming from the wide-angle end to the telephoto end is given by $\Delta\phi 1$min. In addition, when a plurality of the second refractive power variable elements AO2 are provided, the amount of change in the refractive power of a second refractive power variable element AO2min having the smallest amount of change in the refractive power when zooming from the wide-angle end to the telephoto end is $\Delta\phi 2$min. When only one first refractive power variable element AO1 is provided, the amount of change in the refractive power of the refractive power variable element AO1 is $\Delta\phi 1$min. Similarly, when only one second refractive power variable element AO2 is provided, the amount of change in the refractive power variable element is $\Delta\phi 2$min. That is, a minimum value of the amount of change in the refractive power of the first refractive power variable element AO1 when zooming from the wide-angle end to the telephoto end is $\Delta\phi 1$min, and a minimum value of the amount of change in the refractive power of the second refractive power variable element AO2 when zooming from the wide-angle end to the telephoto end is $\Delta\phi 2$min.

Here, the zoom lens satisfies the following conditional expressions:

$$0.05<\Delta\phi 1min\cdot\sqrt{(fw\cdot ft)}<0.5 \quad (2)$$

$$-0.5<\Delta\phi 2min\cdot\sqrt{(fw\cdot ft)}<-0.05 \quad (3)$$

If $\Delta\phi 1min\cdot\sqrt{(fw\cdot ft)}$ becomes less than the lower limit of the Conditional Expression (2), or $\Delta\phi 2min\cdot\sqrt{(fw\cdot ft)}$ becomes greater than the upper limit of the Conditional Expression (3), it becomes difficult to effectively increase the zoom ratio by using the refractive power variable elements. In contrast, if $\Delta\phi 1min\cdot\sqrt{(fw\cdot ft)}$ becomes greater than the upper limit of the Conditional Expression (2) or $\Delta\phi 2min\cdot\sqrt{(fw\cdot ft)}$ becomes less than the lower limit of the Conditional Expression (3), the amount of change of the refractive power when zooming becomes too large, as a result of which variations in the curvature of field tend to become large.

More desirably, therefore, the following Conditional Expressions (2a) and (3a) are satisfied:

$$0.08<\Delta\phi 1min\cdot\sqrt{(fw\cdot ft)}<0.3 \quad (2a)$$

$$-0.3<\Delta\phi 2min\cdot\sqrt{(fw\cdot ft)}<-0.1 \quad (3a)$$

The focal length at the wide-angle end of an optical system from a lens disposed closest to an object side to a lens adjacent to the object side of the first refractive power variable element AO1 is f1, and a focal length at the wide-angle end of an optical system from a lens disposed closest to the object side to a lens adjacent to the object side of the second refractive power variable element AO2 is f2. Here, the following conditional expressions are satisfied:

$$-2.5<f1/\sqrt{(fw\cdot ft)}<-0.7 \quad (4)$$

$$0.1<f2/\sqrt{(fw\cdot ft)}<2.5 \quad (5)$$

Conditional Expression (4) expresses that a light beam that is incident upon the first refractive power variable element AO1 is a divergent beam. If $f1/\sqrt{(fw\cdot ft)}$ becomes less than the lower limit of the Conditional Expression (4), it becomes difficult to increase the imaging magnification, that is, to obtain a high zoom ratio by changing the refractive power of the first refractive power variable element AO1. In contrast, if $f1/\sqrt{(fw\cdot ft)}$ becomes greater than the upper limit of the Conditional Expression (4), it becomes difficult to correct curvature of field. Therefore, this is not desirable.

Conditional Expression (5) expresses that a light beam that is incident upon the second refractive power variable element AO2 is a convergent beam. If $f2/\sqrt{(fw\cdot ft)}$ becomes less than the lower limit of the Conditional Expression (5), it becomes difficult to correct curvature of field. Therefore, this is not desirable. In contrast, if $f2/\sqrt{(fw\cdot ft)}$ becomes greater than the upper limit of the Conditional Expression (5), it becomes difficult to increase the imaging magnification, that is, to obtain a high zoom ratio by changing the refractive power of the second refractive power variable element AO2.

More desirably, the following Conditional Expressions (4a) and (5a) are satisfied:

$$-1.3<f1/\sqrt{(fw\cdot ft)}<-0.7 \quad (4a)$$

$$0.3<f2/\sqrt{(fw\cdot ft)}<1.3 \quad (5a)$$

When there are a plurality of the first refractive power variable elements AO1, it is desirable that each of the plurality of first refractive power variable elements AO1 satisfy the Conditional Expression (4) or the Conditional Expression (4a). Similarly, when there are a plurality of the second refractive power variable elements AO2, it is desirable that each of the second refractive power variable elements AO2 satisfy the Conditional Expression (5) or the Conditional Expression (5a).

In addition, at least one of the first refractive power variable element and the second refractive power variable element constitutes at least one of the lens units that moves when zooming from the wide-angle end to the telephoto end. By moving the refractive power variable element when zooming, it becomes easier to increase the imaging magnification and to reduce variations in aberrations when zooming.

First Embodiment

Next, a zoom lens according to a first embodiment of the present invention will be described with reference to FIG. 1.

The zoom lens according to the first embodiment includes a first lens unit L1 having a positive refractive power, a second lens unit L2 having a negative refractive power, a third lens unit L3, a fourth lens unit L4 having a positive refractive power, a fifth lens unit L5 having a positive refractive power, and a sixth lens unit L6 in that order from an object side to an image side. Here, the third lens unit L3 is formed by a first refractive power variable element AO1, and the sixth lens unit L6 is formed by a second refractive power variable element AO2.

When zooming from the wide-angle end to the telephoto end, the first lens unit L1, the third lens unit L3 (the first refractive power variable element AO1), and the sixth lens unit L6 (the second refractive power variable element AO2) are stationary.

When zooming from the wide-angle end to the telephoto end, the second lens unit L2 is moved towards the image side to approximately double the imaging magnification of the second lens unit L2.

Further, the refractive powers of the first refractive power variable element AO1 and the second refractive power variable element AO2 are changed so that the imaging magnifications thereof are increased when zooming from the wide-angle end to the telephoto end.

When zooming from the wide-angle end to the telephoto end, the imaging magnification of the first refractive power variable element AO1 is changed from 0.89 to 1.28, which is 1.44 times greater than 0.89. In addition, the imaging magnification of the second refractive power variable element AO2 is changed from 0.97 to 1.01, which is 1.04 times greater than 0.97. Here, the reference of the imaging magnification of each refractive power variable element is the d line.

By virtue of the above-described structure, a zoom lens having a high zoom ratio of approximately 9.5 is realized.

Focusing is performed by moving the fifth lens unit L5.

The first refractive power variable element AO1 and the second refractive power variable element AO2 each include an electrolyte and a nonelectrolyte. For the electrolyte of each of the first refractive power variable element AO1 and the second refractive power variable element AO2, water (Nd=1.33, vd=55.7) is used. As used in this specification, Nd represents the refractive index and vd represents the Abbe number for the d-line. In addition, for the nonelectrolyte of the first refractive power variable element AO1, an oily medium having optical characteristics of Nd=1.65 and vd=42.7 is used. For the nonelectrolyte of the second refractive power variable element AO2, an oily medium having optical characteristics of Nd=1.58 and vd=46.2 is used. By this, the refractive power variable elements are formed so that the media of the respective refractive power variable elements do not mix with each other.

Since the first refractive power variable element AO1 is such that the refractive index of the oily medium at the image side is higher than that of the water at the object side, and is such that a curvature radius at an interface is changed from a negative value to a positive value, the refractive power is changed from a negative value to a positive value. In addition, since the second refractive power variable element AO2 is such that the refractive index of the oily medium at the image side is higher than that of the water at the object side, and is such that a curvature radius at an interface is changed from a positive value to a negative value, the refractive power is changed from a positive value to a negative value. Accordingly, by changing the refractive powers of the first refractive power variable element AO1 and the second refractive power variable element AO2 in opposite directions, variations in the Petzval sum when zooming are reduced.

Second Embodiment

A zoom lens according to a second embodiment of the present invention will hereunder be described with reference to FIG. 3.

The zoom lens according to the second embodiment includes a first lens unit L1 having a negative refractive power, a second lens unit L2, a third lens unit L3 having a positive refractive power, and a fourth lens unit L4 in that order from an object side to an image side. Here, the second lens unit L2 includes a first refractive power variable element AO1 and a plurality of lenses, and the fourth lens unit L4 is formed by a second refractive power variable element AO2.

When zooming from a wide-angle end to a telephoto end, the second lens unit L2 including the first refractive power variable element AO1 is moved towards the object side. In addition, by moving the third lens unit L3 towards the image side, the imaging magnification is increased. Further, the refractive powers of the first refractive power variable element AO1 of the second lens unit L2 and the second refractive power variable element AO2 serving as the fourth lens unit L4 are changed so that the imaging magnifications are increased when zooming from the wide-angle end to the telephoto end.

When zooming from the wide-angle end to the telephoto end, the imaging magnification of the first refractive power variable element AO1 is changed from 0.79 to 1.03, which is 1.30 times greater than 0.79. In addition, the imaging magnification of the second refractive power variable element AO2 is changed from 0.98 to 1.02, which is 1.04 times greater than 0.98. Here, the reference of the imaging magnification of each refractive power variable element is the d line.

By virtue of the above-described structure, a zoom lens having a high zoom ratio of approximately 4.8 is realized.

Focusing is performed by moving the third lens unit L3.

The first refractive power variable element AO1 and the second refractive power variable element AO2 each include an electrolyte and a nonelectrolyte. For the electrolyte of each of the first refractive power variable element AO1 and the second refractive power variable element AO2, water (Nd=1.33, vd=55.7) is used. In addition, for the nonelectrolyte of the first refractive power variable element AO1, an oily medium having optical characteristics of Nd=1.65 and vd=33.4 is used. For the nonelectrolyte of the second refractive power variable element AO2, an oily medium having optical characteristics of Nd=1.65 and vd=29.6 is used. By this, the refractive power variable elements are formed so that the media of the respective refractive power variable elements do not mix with each other.

Since the first refractive power variable element AO1 is such that the refractive index of the oily medium at the object side is higher than that of the water at the image side, and is such that a curvature radius at an interface is changed from a positive value to a negative value, the refractive power is changed from a negative value to a positive value. Since the second refractive power variable element AO2 is such that the refractive index of the oily medium at the object side is higher than that of the water at the image side, and is such that a curvature radius at an interface is changed from a negative value to a positive value, the refractive power is changed from a positive value to a negative value. Accordingly, by changing the refractive powers of the first refractive power variable element AO1 and the second refractive power variable element AO2 in opposite directions, variations in the Petzval sum when zooming are reduced.

Third Embodiment

A zoom lens according to a third embodiment of the present invention will hereunder be described with reference to FIG. 5.

The zoom lens according to the third embodiment includes a first lens unit L1 having a positive refractive power, a second lens unit L2 having a negative refractive power, a prism PR, a third lens unit L3, a fourth lens unit L4 having a positive refractive power, a fifth lens unit L5, and a sixth lens unit L6 in that order from an object side to an image side. Here, the third lens unit L3 is formed by a first refractive power variable element AO1, the fifth lens unit L5 is formed by a second refractive power variable element AO2$a$ and a positive lens, and the sixth lens unit L6 is formed by a second refractive power variable element AO2$b$.

When zooming from the wide-angle end to the telephoto end, the first lens unit L1, the prism PR, the third lens unit L3 (the first refractive power variable element AO1), and the sixth lens unit L6 (the second refractive power variable element AO2$b$) are stationary.

When zooming from the wide-angle end to the telephoto end, the second lens unit L2 is moved towards the image side to approximately double the imaging magnification of the second lens unit L2. In addition, the fifth lens unit L5 including the second refractive power variable element AO2$a$ is moved towards the image side. Further, the refractive powers of the first refractive power variable element AO1 constituting the third lens unit L3, the second refractive power variable element AO2$a$ of the fifth lens unit L5, and the second refractive power variable element AO2$b$ constituting the sixth lens unit L6 are changed so that the imaging magnifications thereof are increased.

When zooming from the wide-angle end to the telephoto end, the imaging magnification of the first refractive power variable element AO1 is changed from 1.04 to 1.49, which is 1.43 times greater than 1.04. In addition, the imaging magnification of the second refractive power variable element AO2$a$ is changed from 0.98 to 1.06, which is 1.08 times greater than 0.98. Further, the imaging magnification of the second refractive power variable element AO2$b$ is changed from 1.00 to 1.03, which is 1.03 times greater than 1.00.

By virtue of the above-described structure, a zoom lens having a high zoom ratio of approximately 9.5 is realized.

Focusing is performed by moving the fifth lens unit L5 including the second refractive power variable element AO2$a$.

The first refractive power variable element AO1 and the second refractive power variable elements AO2$a$ and AO2$b$ each include an electrolyte and a nonelectrolyte. For the electrolyte of all of the refractive power variable elements, water (Nd=1.33, vd=55.7) is used. For the nonelectrolyte of all of the refractive power variable elements, an oily medium having optical characteristics of Nd=1.74 and vd=40.0 is used. By this, the refractive power variable elements are formed so that the media of the respective refractive power variable elements do not mix with each other.

Since the first refractive power variable element AO1 is such that the refractive index of the oily medium at the image side is higher than that of the water at the object side, and is such that a positive curvature radius at a liquid interface is increased, a positive refractive power is increased. Since each of the second refractive power variable elements AO2a and AO2b is such that the refractive index of the oily medium at the image side is higher than that of the water at the object side, and is such that a curvature radius at an interface is changed from a positive value to a negative value, each refractive power is changed from a positive value to a negative value. Accordingly, by changing the refractive powers of the first refractive power variable element AO1 and the second refractive power variable elements AO2a and AO2b in opposite directions, variations in the Petzval sum when zooming are reduced.

Fourth Embodiment

A zoom lens according to a fourth embodiment of the present invention will hereunder be described with reference to FIG. 7.

The zoom lens according to the fourth embodiment includes a first lens unit L1 having a negative refractive power, a second lens unit L2 having a positive refractive power, a third lens unit L3, a fourth lens unit L4 having a positive refractive power, and a fifth lens unit L5 in that order from an object side to an image side. Here, the third lens unit L3 includes a 3a-th lens unit L3a, a first refractive power variable element AO1, and a 3b-th lens unit L3b. The fifth lens unit L5 is formed by a second refractive power variable element AO2.

In the embodiment, when zooming from the wide-angle end to the telephoto end, the first lens unit L1 and the fifth lens unit L5 (the second refractive power variable element AO2) are stationary.

When zooming from the wide-angle end to the telephoto end, the fourth lens unit L4 is moved towards the object side to increase the imaging magnification of the fourth lens unit L2 by approximately 1.2 fold. In addition, the refractive power of the first refractive power variable element AO1 disposed between the 3a-th lens unit L3a and the 3b-th lens unit L3b, and the refractive power of the second refractive power variable element AO2 constituting the fifth lens unit L5 are changed so that the imaging magnifications thereof are increased.

When zooming from the wide-angle end to the telephoto end, the imaging magnification of the first refractive power variable element AO1 is changed from 0.66 to 0.87, which is 1.32 times greater than 0.66. In addition, the imaging magnification of the second refractive power variable element AO2 is changed from 0.72 to 1.40, which is 1.95 times greater than 0.72.

By virtue of the above-described structure, an ultra wide-angle zoom lens having a high zoom ratio of approximately 2.1 is realized.

The first lens unit L1 includes a 1a-th lens unit L1a and a 1b-th lens unit L1b in that order from the object side to the image side. Focusing is performed by moving the 1b-th lens unit L1b.

The first refractive power variable element AO1 and the second refractive power variable elements AO2 each include an electrolyte and a nonelectrolyte. For the electrolyte of each of the first refractive power variable element AO1 and the second refractive power variable elements AO2a and AO2b, water (Nd=1.33, vd=55.7) is used. For the nonelectrolyte of the first refractive power variable element AO1, an oily medium having optical characteristics of Nd=1.73 and vd=40.0 is used. For the nonelectrolyte of the second refractive power variable element AO2, an oily medium having optical characteristics of Nd=1.48 and vd=54.6 is used.

Since the first refractive power variable element AO1 is such that the refractive index of the oily medium at the image side is higher than that of the water at the object side, and is such that a negative curvature radius at a liquid interface is increased, a negative refractive power is reduced. Since the second refractive power variable element AO2 is such that the refractive index of the oily medium at the image side is higher than that of the water at the object side, and is such that a curvature radius at an interface is changed from a positive value to a negative value, the refractive power is changed from a positive value to a negative value. Accordingly, by changing the refractive powers of the first refractive power variable element AO1 and the second refractive power variable element AO2 in opposite directions, variations in the Petzval sum when zooming are reduced.

Although preferred embodiments of the present invention are described, the present invention is not limited to these embodiments, so that various modifications and changes can be made within the scope of the gist of the present invention.

Next, experimental data of numerical examples corresponding to each embodiment will be given below. In the numerical examples, i (where i=1, 2, 3 . . . ) denotes the order of a surface from an object plane, ri denotes a curvature radius of a lens surface, di denotes a lens thickness and an air gap between an i-th surface and a (i+1)th surface, ndi and vdi denote respectively a refractive index and an Abbe number with respect to the d-line.

In addition, a glass block GB disposed closest to the image side corresponds to, for example, a CCD protective glass or a low-pass filter. When a given lens surface is an aspherical surface, the surface is demarked with an asterisk (*), and k, A, B, C, D, E, etc. denote aspherical coefficients.

The aspherical shape is expressed by the following expression when a displacement along a direction of an optical axis at a position of a height h from the optical axis is x with reference to a surface vertex:

$$x=(h^2/R)/[1+\{1-(1+k)(h/R)^2\}^{1/2}]+Ah^4+Bh^6+Ch^8+Dh^{10}+Eh^{12}$$

where R denotes a curvature radius. In the aspherical surface data, the normalized scientific notation "M e±N" is equivalent to "M×10$^{±N}$".

Numerical Example 1

Units mm

Surface data

| Surface number | r | d | nd | vd | Effective diameter |
|---|---|---|---|---|---|
| 1 | 28.479 | 1.20 | 1.84666 | 23.8 | 25.75 |
| 2 | 17.564 | 5.48 | 1.77250 | 49.6 | 22.80 |
| 3 | 6873.853 | (variable) | | | 21.95 |
| 4 | 147.858 | 0.80 | 1.88300 | 40.8 | 16.84 |
| 5 | 8.515 | 4.59 | | | 12.59 |
| 6* | −18.084 | 1.00 | 1.88300 | 40.8 | 12.39 |
| 7* | 143.569 | 0.10 | | | 12.82 |
| 8 | 380.124 | 3.03 | 1.94595 | 18.0 | 12.91 |
| 9 | −26.866 | (variable) | | | 13.12 |
| 10 | infinity | 0.61 | 1.33304 | 55.7 | 9.00 |
| 11 | (variable) | 0.64 | 1.65294 | 42.8 | 8.89 |
| 12 | infinity | (variable) | | | 8.78 |
| 13* | 12.178 | 3.50 | 1.49700 | 81.5 | 7.65 |

-continued

Units mm

| | | | | | |
|---|---|---|---|---|---|
| 14 | −27.439 | 2.50 | | | 8.43 |
| 15 | 7.898 | 3.39 | 1.49700 | 81.5 | 7.39 |
| 16 | 20.614 | 0.60 | 2.00330 | 28.3 | 6.09 |
| 17 | 6.609 | 0.40 | | | 5.71 |
| 18 | 16.233 | 1.15 | 1.72825 | 28.5 | 5.71 |
| 19 | 38.772 | (variable) | | | 5.70 |
| 20* | 17.363 | 1.97 | 1.45600 | 90.3 | 8.66 |
| 21 | 344.622 | (variable) | | | 8.55 |
| 22 | infinity | 0.55 | 1.33304 | 55.7 | 10.00 |
| 23 | (variable) | 0.55 | 1.58068 | 46.2 | 10.00 |
| 24 | infinity | | | | 10.00 |

Image plane
Aspherical surface data

6th surface $K = 0.00000e+000$   $A4 = -6.02345e-004$   $A6 = 1.34031e-005$
$A8 = -1.91200e-007$   $A10 = 1.56592e-009$ 7th surface $K = -3.21679e+003$   $A4 = -4.54896e-004$   $A6 = 1.01416e-005$
$A8 = -1.29730e-007$   $A10 = 1.05351e-009$ 13th surface $K = 1.05797e+000$   $A4 = -1.74178e-004$   $A6 = -1.08865e-006$
$A8 = -5.81524e-009$ 20th surface $K = 9.63774e+000$   $A4 = -2.50683e-004$   $A6 = 5.21092e-007$
$A8 = -4.99622e-007$   $A10 = 2.55173e-009$ Various data
Zoom ratio 9.45

| | Wide-angle | Intermediate | Telephoto |
|---|---|---|---|
| Focal length | 5.20 | 16.08 | 49.14 |
| F number | 2.93 | 3.93 | 6.30 |
| Angle of view | 33.9 | 12.3 | 4.1 |
| Image height | 3.50 | 3.50 | 3.50 |
| Total lens height | 80.75 | 80.75 | 80.75 |
| BF | 4.04 | 4.04 | 4.04 |
| d3 | 0.55 | 9.03 | 13.24 |
| d9 | 13.34 | 4.86 | 0.65 |
| d12 | 23.05 | 14.50 | 1.97 |
| d19 | 3.73 | 15.26 | 26.79 |
| d21 | 3.99 | 1.00 | 2.01 |
| d24 | 4.07 | 5.33 | 23.28 |
| r11 | −84.67 | −1423.26 | 35.80 |
| d10 | 0.61 | 0.53 | 0.34 |
| d11 | 0.64 | 0.72 | 0.91 |
| r23 | 35.15 | 91.55 | −75.00 |
| d22 | 0.55 | 0.69 | 0.88 |
| d23 | 0.55 | 0.41 | 0.22 |
| Entrance pupil position | 17.72 | 41.01 | 52.15 |
| Exit pupil position | −21.48 | −54.88 | −113.40 |
| Front principal point position | 21.86 | 52.70 | 80.76 |
| Rear principal point position | −1.13 | −12.08 | −44.90 |

Data of zoom lens units

| Unit | 1st surface | Focal length | Lens configuration length | Front principal point position | Rear principal point position |
|---|---|---|---|---|---|
| 1 | 1 | 39.24 | 6.68 | −0.12 | −3.86 |
| 2 | 4 | −9.14 | 9.52 | 0.32 | −7.51 |
| 3 | 10 | −264.68 | 1.25 | 0.46 | −0.39 |
| 4 | 13 | 17.56 | 11.53 | −5.41 | −10.05 |
| 5 | 20 | 40.02 | 1.97 | −0.07 | −1.42 |
| 6 | 22 | 141.94 | 1.10 | 0.41 | −0.35 |

-continued

Units mm

Single lens data

| Lens | 1st surface | Focal length |
|---|---|---|
| 1 | 1 | −57.00 |
| 2 | 2 | 22.79 |
| 3 | 4 | −10.26 |
| 4 | 6 | −18.14 |
| 5 | 8 | 26.62 |
| 6 | 10 | 254.24 |
| 7 | 11 | −129.68 |
| 8 | 13 | 17.48 |
| 9 | 15 | 23.67 |
| 10 | 16 | −9.91 |
| 11 | 18 | 37.54 |
| 12 | 20 | 40.02 |
| 13 | 22 | −105.54 |
| 14 | 23 | 60.53 |

Numerical Example 2

Units mm

Surface data

| Surface number | r | d | nd | vd | Effective diameter |
|---|---|---|---|---|---|
| 1* | 822.436 | 1.10 | 1.86400 | 40.6 | 14.40 |
| 2* | 6.178 | 1.95 | | | 10.70 |
| 3 | 8.151 | 1.80 | 1.94595 | 18.0 | 11.30 |
| 4 | 11.485 | (variable) | | | 10.70 |
| 5 | infinity | (variable) | 1.64600 | 33.4 | 5.20 |
| 6 | (variable) | (variable) | 1.33304 | 55.8 | 5.20 |
| 7 | infinity | 0.10 | | | 5.20 |
| 8* | 5.918 | 1.80 | 1.85135 | 40.1 | 5.50 |
| 9 | 64.692 | 0.23 | | | 5.20 |
| 10 | 7.646 | 1.30 | 1.71999 | 50.2 | 4.90 |
| 11 | −106.751 | 0.50 | 1.84666 | 23.8 | 4.50 |
| 12 | 3.885 | 0.94 | | | 4.00 |
| 13 | 27.578 | 1.00 | 1.74950 | 35.3 | 4.00 |
| 14 | −29.647 | 0.58 | | | 4.00 |
| 15 (stop) | infinity | (variable) | | | 2.99 |
| 16* | 18.844 | 1.20 | 1.69350 | 53.2 | 8.30 |
| 17 | 67.088 | (variable) | | | 8.30 |
| 18 | infinity | (variable) | 1.65400 | 29.6 | 8.00 |
| 19 | (variable) | (variable) | 1.33304 | 55.8 | 8.00 |
| 20 | infinity | 1.00 | | | 8.00 |
| 21 | infinity | 0.50 | 1.51633 | 64.1 | 20.00 |
| 22 | infinity | (variable) | | | 20.00 |

Aspherical surface data

1st surface $K = -4.39302e+005$   $A4 = 2.66495e-004$   $A6 = -3.66801e-006$
$A8 = 2.93756e-008$   $A10 = -1.12868e-010$ 2nd surface $K = -1.73497e+000$   $A4 = 1.07426e-003$   $A6 = -1.07394e-006$
$A8 = 1.26888e-007$   $A10 = 8.27304e-011$ 8th surface $K = -3.07128e-001$   $A4 = -2.29854e-004$   $A6 = 6.52175e-006$
$A8 = -1.64145e-006$   $A10 = 8.32941e-008$ 16th surface $K = 0.00000e+000$   $A4 = 5.73806e-005$   $A6 = 3.23139e-005$
$A8 = -2.35249e-006$   $A10 = 6.20072e-008$

Units mm

Various data
Zoom ratio 4.75

|  | Wide-angle | Intermediate | Telephoto |
|---|---|---|---|
| Focal length | 4.43 | 12.65 | 21.05 |
| F number | 2.88 | 4.26 | 5.88 |
| Angle of view | 37.50 | 15.04 | 9.17 |
| Image height | 3.40 | 3.40 | 3.40 |
| Total lens height | 40.82 | 34.72 | 39.64 |
| BF | 0.30 | 0.27 | 0.18 |
| d4 | 18.49 | 4.26 | 1.12 |
| d15 | 2.40 | 11.85 | 19.20 |
| d17 | 3.63 | 2.33 | 3.13 |
| d22 | 0.30 | 3.80 | 8.44 |
| r6 | 37.56 | 351.26 | −187.78 |
| r19 | −32.10 | −160.48 | 32.10 |
| Entrance pupil position | 8.44 | 7.27 | 6.88 |
| Exit pupil position | −9.42 | −22.95 | −31.72 |
| Front principal point position | 10.85 | 13.03 | 14.04 |
| Rear principal point position | −4.13 | −12.38 | −20.87 |

Data of zoom lens units

| Unit | 1st surface | Focal length | Lens configuration length | Front principal point position | Rear principal point position |
|---|---|---|---|---|---|
| 1 | 1 | −10.50 | 4.85 | 0.53 | −2.75 |
| 2 | 5 | 10.64 | 7.45 | −0.95 | −5.62 |
| 3 | 16 | 37.41 | 1.20 | −0.27 | −0.98 |
| 4 | 18 | 100.00 | 2.50 | 0.38 | −1.61 |

Single lens data

| Lens | 1st surface | Focal length |
|---|---|---|
| 1 | 1 | −7.21 |
| 2 | 3 | 23.51 |
| 3 | 5 | −58.14 |
| 4 | 6 | 112.76 |
| 5 | 8 | 7.54 |
| 6 | 10 | 9.96 |
| 7 | 11 | −4.42 |
| 8 | 13 | 19.21 |
| 9 | 16 | 37.41 |
| 10 | 18 | 49.08 |
| 11 | 19 | −96.37 |
| 12 | 21 | 0.00 |

Numerical Example 3

Units mm

Surface data

| Surface number | r | d | nd | vd | Effective diameter |
|---|---|---|---|---|---|
| 1 | 29.397 | 1.20 | 1.84666 | 23.8 | 25.77 |
| 2 | 17.032 | 5.55 | 1.77250 | 49.6 | 22.60 |
| 3 | 1892.933 | (variable) |  |  | 21.62 |
| 4 | 156.862 | 0.80 | 1.88300 | 40.8 | 17.32 |
| 5 | 9.488 | 4.42 |  |  | 13.25 |
| 6* | −17.514 | 1.00 | 1.88300 | 40.8 | 13.04 |
| 7* | 37.762 | 0.10 |  |  | 13.25 |
| 8 | 63.542 | 2.03 | 1.94595 | 18.0 | 13.25 |
| 9 | −30.670 | (variable) |  |  | 13.36 |
| 10 | infinity | 8.00 | 1.80610 | 33.3 | 10.00 |
| 11 | infinity | 0.10 |  |  | 9.02 |
| 12 | infinity | (variable) | 1.33304 | 55.7 | 9.02 |
| 13 | (variable) | (variable) | 1.73770 | 40.0 | 8.92 |
| 14 | infinity | (variable) |  |  | 8.87 |
| 15* | 11.394 | 4.99 | 1.49700 | 81.5 | 7.94 |
| 16 | −26.014 | 2.50 |  |  | 8.35 |
| 17 | 9.232 | 2.72 | 1.49700 | 81.5 | 7.25 |
| 18 | 20.516 | 0.60 | 2.00330 | 28.3 | 6.31 |
| 19 | 7.095 | 0.33 |  |  | 5.94 |
| 20 | 13.895 | 1.56 | 1.69895 | 30.1 | 5.94 |
| 21 | 23.416 | (variable) |  |  | 5.84 |
| 22 | infinity | (variable) | 1.33304 | 55.7 | 8.15 |
| 23 | (variable) | (variable) | 1.73770 | 40.0 | 8.20 |
| 24 | infinity | 0.10 |  |  | 8.28 |
| 25* | 15.007 | 2.04 | 1.43875 | 95.0 | 8.42 |
| 26 | 3459.951 | (variable) |  |  | 8.35 |
| 27 | infinity | (variable) | 1.33304 | 55.7 | 10.00 |
| 28 | (variable) | (variable) | 1.73770 | 40.0 | 10.00 |
| 29 | infinity |  |  |  | 10.00 |

Aspherical surface data

6th surface

K = 0.00000e+000   A4 = −4.22458e−004   A6 = 2.03537e−005
A8 = −4.48262e−007   A10 = 3.76964e−009

7th surface

K = −9.37295e+001   A4 = −1.86139e−004   A6 = 1.34122e−005
A8 = −3.14173e−007   A10 = 2.71380e−009

15th surface

K = 7.74031e−001   A4 = −1.79994e−004   A6 = −1.21748e−006
A8 = −7.68902e−009

25th surface

K = 8.98920e−001   A4 = −4.72110e−005   A6 = 7.06658e−006
A8 = −5.65233e−007   A10 = 1.33876e−008

Various data
Zoom ratio 9.45

|  | Wide-angle | Intermediate | Telephoto |
|---|---|---|---|
| Focal length | 5.20 | 14.42 | 49.14 |
| F number | 2.93 | 3.93 | 6.22 |
| Angle of view | 33.9 | 13.6 | 4.1 |
| Image height | 3.50 | 3.50 | 3.50 |
| Total lens height | 88.50 | 88.50 | 88.50 |
| BF | 4.12 | 4.12 | 4.12 |
| d3 | 0.55 | 8.16 | 14.34 |
| d9 | 14.34 | 6.73 | 0.55 |
| d14 | 20.96 | 12.82 | 0.65 |
| d21 | 3.09 | 14.02 | 26.69 |
| d26 | 3.79 | 1.00 | 0.50 |
| d29 | 4.15 | 5.86 | 26.09 |
| r13 | 368.81 | 76.23 | 30.33 |
| d12 | 0.60 | 0.53 | 0.40 |
| d13 | 0.60 | 0.67 | 0.80 |
| r23 | 380.89 | −75.00 | −60.00 |
| d22 | 0.60 | 0.70 | 0.72 |
| d23 | 0.60 | 0.50 | 0.48 |
| r28 | 39181.87 | −6802.20 | −60.00 |
| d27 | 0.60 | 0.60 | 0.74 |
| d28 | 0.60 | 0.60 | 0.46 |
| Entrance pupil position | 18.07 | 37.68 | 58.44 |
| Exit pupil position | −21.04 | −46.48 | −74.15 |
| Front principal point position | 22.19 | 47.98 | 76.79 |
| Rear principal point position | −1.05 | −10.38 | −44.87 |

-continued

Units mm

Data of zoom lens units

| Unit | 1st surface | Focal length | Lens configuration length | Front principal point position | Rear principal point position |
|---|---|---|---|---|---|
| 1 | 1 | 41.39 | 6.75 | −0.18 | −3.95 |
| 2 | 4 | −8.48 | 8.35 | 0.98 | −5.62 |
| PR | 10 | infinity | 8.00 | 0.00 | 0.00 |
| 3 | 12 | 911.40 | 1.20 | 0.45 | −0.35 |
| 4 | 15 | 18.97 | 12.71 | −6.15 | −11.01 |
| 5 | 22 | 33.15 | 3.34 | 0.87 | −1.44 |
| 6 | 27 | 96826.88 | 1.20 | 0.45 | −0.35 |

Single lens data

| Lens | 1st surface | Focal length |
|---|---|---|
| 1 | 1 | −50.05 |
| 2 | 2 | 22.22 |
| 3 | 4 | −11.47 |
| 4 | 6 | −13.44 |
| 5 | 8 | 22.10 |
| 6 | 10 | 0.00 |
| 7 | 12 | −1107.39 |
| 8 | 13 | 499.94 |
| 9 | 15 | 16.68 |
| 10 | 17 | 31.27 |
| 11 | 18 | −11.06 |
| 12 | 20 | 45.80 |
| 13 | 22 | −1143.68 |
| 14 | 23 | 516.32 |
| 15 | 25 | 34.35 |
| 16 | 27 | −117648.78 |
| 17 | 28 | 53113.55 |

Numerical Example 4

Units mm

Surface data

| Surface number | r | d | nd | vd | Effective diameter |
|---|---|---|---|---|---|
| 1* | 87.448 | 3.50 | 1.58593 | 59.6 | 43.54 |
| 2 | 13.318 | 13.54 | | | 26.01 |
| 3 | −145.556 | 1.30 | 1.77250 | 49.6 | 24.47 |
| 4 | 24.148 | 0.06 | 1.51640 | 52.2 | 22.07 |
| 5* | 21.710 | 1.18 | | | 22.05 |
| 6 | 27.601 | 3.88 | 1.72825 | 28.5 | 21.85 |
| 7 | 97.186 | (variable) | | | 20.76 |
| 8 | −54.322 | 1.25 | 1.83481 | 42.7 | 11.65 |
| 9 | 15.722 | 4.13 | 1.51742 | 52.4 | 11.48 |
| 10 | −36.387 | 1.06 | | | 12.06 |
| 11 (stop) | infinity | 1.50 | | | 12.26 |
| 12 | 57.720 | 2.48 | 1.51823 | 58.9 | 13.42 |
| 13 | −32.609 | (variable) | | | 13.74 |
| 14 | −28.135 | 0.80 | 1.80400 | 46.6 | 14.44 |
| 15 | −73.400 | 0.17 | | | 14.90 |
| 16 | infinity | 1.90 | 1.33304 | 55.7 | 15.15 |
| 17 | (variable) | 1.10 | 1.73769 | 40.0 | 15.69 |
| 18 | infinity | 0.30 | | | 16.12 |
| 19 | 47.868 | 3.42 | 1.84666 | 23.8 | 16.99 |
| 20 | −36.983 | (variable) | | | 17.38 |
| 21 | 59.392 | 5.76 | 1.48749 | 70.2 | 17.67 |
| 22 | −18.267 | 1.00 | 1.83400 | 37.2 | 17.59 |
| 23 | 38.697 | 0.05 | | | 18.46 |
| 24 | 18.482 | 6.35 | 1.43875 | 95.0 | 20.18 |
| 25 | −29.769 | 0.15 | | | 20.32 |
| 26 | 157.796 | 1.00 | 1.83400 | 37.2 | 19.89 |
| 27 | 16.754 | 7.24 | 1.48456 | 70.0 | 19.28 |
| 28* | −26.534 | (variable) | | | 19.64 |
| 29 | infinity | 4.50 | 1.33304 | 55.7 | 19.91 |
| 30 | (variable) | 3.80 | 1.48000 | 54.6 | 20.25 |
| 31 | infinity | 32.19 | | | 20.25 |
| 32 | infinity | 2.90 | 1.54400 | 67.6 | 50.00 |
| 33 | infinity | | | | 50.00 |

Aspherical surface data

1st surface

K = 0.00000e+000  A4 = 2.81271e−005  A6 = −6.64739e−008
A8 = 1.81153e−010  A10 = −2.68350e−013  A12 = 1.90592e−016

5th surface

K = 0.00000e+000  A4 = 2.48045e−006  A6 = −4.21349e−007
A8 = 3.98551e−009  A10 = −2.93680e−011  A12 = 9.05546e−014

28th surface

K = 0.00000e+000  A4 = 2.93617e−005  A6 = −7.97543e−008
A8 = 4.56680e−009  A10 = −4.19447e−011  A12 = 2.35569e−013

Various data
Zoom ratio 2.07

| | Wide-angle | Intermediate | Telephoto |
|---|---|---|---|
| Focal length | 10.32 | 12.65 | 21.36 |
| F number | 3.03 | 3.42 | 4.63 |
| Angle of view | 52.82 | 49.44 | 42.11 |
| Image height | 13.60 | 13.60 | 13.60 |
| Total lens height | 133.06 | 133.06 | 133.06 |
| BF | 1.24 | 1.24 | 1.24 |
| d7 | 17.28 | 13.42 | 4.74 |
| d13 | 1.27 | 1.11 | 4.41 |
| d20 | 6.90 | 5.62 | 1.26 |
| d28 | 0.10 | 5.37 | 15.15 |
| d33 | 1.19 | 0.69 | 2.17 |
| r17 | −33.75 | −40.53 | −100.91 |
| r30 | 19.52 | 35.92 | −14.06 |
| Entrance pupil position | 16.95 | 16.53 | 15.25 |
| Exit pupil position | −151.07 | −121.58 | −80.18 |
| Front principal point position | 26.57 | 27.88 | 31.01 |
| Rear principal point position | −9.12 | −11.46 | −20.16 |

Data of zoom lens units

| Unit | 1st surface | Focal length | Lens configuration length | Front principal point position | Rear principal point position |
|---|---|---|---|---|---|
| 1 | 1 | −14.99 | 23.46 | 6.70 | −11.25 |
| 2 | 8 | 110.30 | 10.43 | 22.72 | 19.29 |
| 3 | 14 | 72.11 | 7.69 | 10.27 | 6.42 |
| 4 | 21 | 96.08 | 21.54 | 18.60 | 4.34 |
| 5 | 29 | 132.82 | 43.39 | 3.38 | −36.64 |

Single lens data

| Lens | 1st surface | Focal length |
|---|---|---|
| 1 | 1 | −27.29 |
| 2 | 3 | −26.72 |
| 3 | 4 | −419.79 |
| 4 | 6 | 51.72 |
| 5 | 8 | −14.49 |
| 6 | 9 | 21.81 |
| 7 | 12 | 40.59 |
| 8 | 14 | −57.19 |
| 9 | 16 | 101.33 |
| 10 | 17 | −45.75 |
| 11 | 19 | 25.11 |

-continued

| | Units mm | |
|---|---|---|
| 12 | 21 | 29.37 |
| 13 | 22 | −14.76 |
| 14 | 24 | 27.08 |
| 15 | 26 | −22.55 |
| 16 | 27 | 22.42 |
| 17 | 29 | −58.61 |
| 18 | 30 | 40.66 |
| 19 | 32 | 0.00 |

Values of the conditional expressions in each of the numerical examples are given in Table 1.

TABLE 1

| | CONDITIONAL EXPRESSION (1) | CONDITIONAL EXPRESSION (2) | CONDITIONAL EXPRESSION (3) | CONDITIONAL EXPRESSION (4) | CONDITIONAL EXPRESSION (5) |
|---|---|---|---|---|---|
| NUMERICAL EXAMPLE 1 | 0.038 | 0.203 | −0.165 | −0.88 | 0.34 |
| NUMERICAL EXAMPLE 2 | 0.097 | 0.097 | −0.193 | −1.09 | 0.47 |
| NUMERICAL EXAMPLE 3 | 0.037 | 0.196 | −0.125 | −0.80 | 0.47 (AO2a) 0.33 (AO2b) |
| NUMERICAL EXAMPLE 4 | 0.148 | 0.118 | −0.267 | −0.71 | 0.97 |

Figure 10:
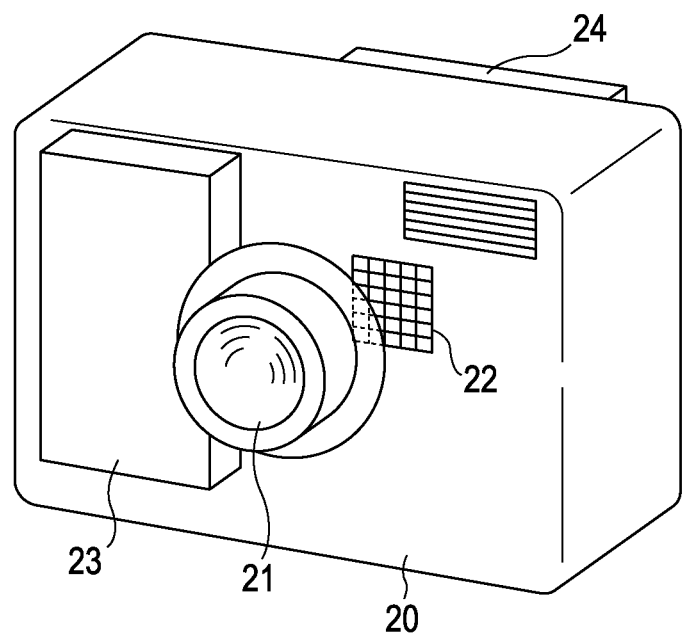
FIG. 10 is a schematic view of an image pickup device according to an embodiment of the present invention.

Next, an embodiment of a digital still camera (image pickup device or optical device) using the zoom lens according to the present invention as an image-taking optical system will be described with reference to FIG. 10. In FIG. 10, reference numeral 20 denotes a camera body, and reference numeral 21 denotes an image-taking optical system formed by the zoom lens according to the present invention. Reference numeral 22 denotes a solid-state image pickup element (photoelectric conversion element), such as a CCD sensor or a CMOS sensor, that receives an object image formed by the image-forming optical system 21 and that is disposed in the camera body. Reference numeral 23 denotes a memory that records information corresponding to the object image that is subjected to photoelectric conversion performed by the image pickup element 22. Reference numeral 24 denotes a viewfinder formed by, for example, a liquid crystal display panel and used for observing the object image formed on the image pickup element 22. By applying the zoom lens according to the present invention to an image pickup device such as a digital still camera in this way, a small image pickup apparatus having high optical performance is realized.

According to the present invention, it is possible to provide a zoom lens having a high zoom ratio and having reduced variations in curvature of field resulting from zooming.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/068035, filed Oct. 19, 2009, which is hereby incorporated by reference herein in its entirety.

REFERENCE SIGNS LIST

AO1 First Refractive Power Variable Element
AO2 Second Refractive Power Variable Element

The invention claimed is:

1. A zoom lens configured to zoom from a wide angle end to a telephoto end, comprising:
a first refractive power variable element whose refractive power is changed in a positive direction by changing a shape of a boundary surface of different media when zooming from the wide-angle end to the telephoto end, and
a second refractive power variable element whose refractive power is changed in a negative direction by changing a shape of a boundary surface of different media when zooming from the wide-angle end to the telephoto end,
wherein, when zooming from the wide-angle end to the telephoto end, imaging magnifications of the first refractive power variable element and the second refractive power variable element are increased, and
wherein the following conditional expression is satisfied;

$0.05 < \Delta\phi 1min \cdot \sqrt{(fw \cdot ft)} < 0.5$ $-0.5 < \Delta\phi 2min \cdot \sqrt{(fw \cdot ft)} < -0.05$ wherein, in zooming from the wide-angle end to the telephoto end, when a plurality of the first refractive power variable elements are provided, an amount of change of a refractive power of the first refractive power variable element having a smallest amount of change in the refractive power is $\Delta\phi 1min$, or, when only one first refractive power variable element is provided, the amount of change of the refractive power of the first refractive power variable element is $\Delta\phi 1min$, and when a plurality of the second refractive power variable elements are provided, an amount of change of a refractive power of the second refractive power variable element having a smallest amount of change in the refractive power is $\Delta\phi 2min$, or when only one second refractive power variable element is provided, the amount of change of the refractive power of the second refractive power variable element is $\Delta\phi 2min$.

2. The zoom lens according to claim 1, wherein at least one of the first refractive power variable element and the second refractive power variable element constitutes at least one of the plurality of lens units that moves when zooming from the wide-angle end to the telephoto end.

3. The zoom lens according to claim 1, wherein the following conditional expressions are satisfied:

$-2.5 < f1/\sqrt{(fw \cdot ft)} < -0.7$ $0.1 < f2/\sqrt{(fw \cdot ft)} < 2.5$ where a focal length at the wide-angle end of an optical system from a lens disposed closest to an object side to a lens adjacent to the object side of the first refractive power variable element is f1, and a focal length at the wide-angle end of an optical system from a lens disposed closest to the object side to a lens adjacent to the object side of the second refractive power variable element is f2.

4. The zoom lens according to claim 1, further comprising:
a lens unit whose refractive power does not change when zooming,
wherein an imaging magnification of the lens unit whose refractive power does not change is increased when zooming from the wide-angle end to the telephoto end.

5. An image pickup device comprising:
a zoom lens,
wherein, the zoom lens is configured to zoom from a wide angle end to a telephoto end, and comprises:
a first refractive power variable element whose refractive power is changed in a positive direction by changing a shape of a boundary surface of different media when zooming from the wide-angle end to the telephoto end, and
a second refractive power variable element whose refractive power is changed in a negative direction by changing a shape of a boundary surface of different media when zooming from the wide-angle end to the telephoto end,
wherein, when zooming from the wide-angle end to the telephoto end, imaging magnifications of the first refractive power variable element and the second refractive power variable element are increased, and
wherein the following conditional expression is satisfied;

$$0.05 < \Delta\phi1min \cdot \sqrt{(fw \cdot ft)} < 0.5$$

$$-0.5 < \Delta\phi2min \cdot \sqrt{(fw \cdot ft)} < -0.05$$

wherein, in zooming from the wide-angle end to the telephoto end, when a plurality of the first refractive power variable elements are provided, and amount of change of a refractive power of the first refractive power variable element having a smallest amount of change in the refractive power is $\Delta\phi1min$, or, when only one first refractive power variable element is provided, the amount of change of the refractive power of the first refractive power variable element is $\Delta\phi1min$, and when a plurality of the second refractive power variable elements are provided, an amount of change of a refractive power of the second refractive power variable element having a smallest amount of change in the refractive power $\Delta\phi2min$, or when only one second refractive power variable element is provided, the amount of change of the refractive power of the second refractive power variable element is $\Delta\phi2min$.

6. The zoom lens according to claim 1, wherein the following conditional expression is satisfied:

$$0 < |\Delta\phi1 + \Delta\phi2| \cdot \sqrt{(fw \cdot ft)} < 0.15$$

where an amount of change of the refractive power of the first refractive power variable element when zooming from the wide-angle end to the telephoto end is $\Delta\phi1$, an amount of change of the refractive power of the second refractive power variable element when zooming from the wide-angle end to the telephoto end is $\Delta\phi2$, and focal lengths of the entire zoom lens at the wide-angle end and the telephoto end are fw and ft, respectively.

7. A zoom lens configured to zoom from a wide-angle end to a telephoto end, comprising:
a first refractive power variable element whose refractive power is changed in a positive direction by changing a shape of a boundary surface of different media when zooming from the wide-angle end to the telephoto end, and
a second refractive power variable element whose refractive power is changed in a negative direction by changing a shape of a boundary surface of different media when zooming from the wide-angle end to the telephoto end,
wherein, when zooming from the wide-angle end to the telephoto end, imaging magnifications of the first refractive power variable element and the second refractive power variable element are increased, and
wherein the following conditional expressions are satisfied:

$$-2.5 < f1/\sqrt{(fw \cdot ft)} < -0.7$$

$$0.1 < f2/\sqrt{(fw \cdot ft)} < 2.5$$

where a focal length at the wide-angle end of an optical system from a lens disposed closest to an object side to a lens adjacent to the object side of the first refractive power variable element is f1, and a focal length at the wide-angle end of an optical system from a lens disposed closest to the object side to a lens adjacent to the object side of the second refractive power variable element is f2, and
where focal lengths of the entire zoom lens at the wide-angle end and the telephoto end are fw and ft, respectively.

8. An image pickup device comprising
a zoom lens,
wherein the zoom lens is configured to zoom from a wide-angle end to a telephoto end, and comprises:
a first refractive power variable element whose refractive power is changed in a positive direction by changing a shape of a boundary surface of different media when zooming from the wide-angle end to the telephoto end, and
a second refractive power variable element whose refractive power is changed in a negative direction by changing a shape of a boundary surface of different media when zooming from the wide-angle end to the telephoto end,
wherein, when zooming from the wide-angle end to the telephoto end, imaging magnifications of the first refractive power variable element and the second refractive power variable element are increased, and
wherein the following conditional expressions are satisfied:

$$-2.5 < f1/\sqrt{(fw \cdot ft)} < -0.7$$

$$0.1 < f2/\sqrt{(fw \cdot ft)} < 2.5$$

where a focal length at the wide-angle end of an optical system from a lens disposed closest to an object side to a lens adjacent to the object side of the first refractive power variable element is f1, and a focal length at the wide-angle end of an optical system from a lens disposed closest to the object side to a lens adjacent to the object side of the second refractive power variable element is f2, and
where focal lengths of the entire zoom lens at the wide-angle end and the telephoto end are fw and ft, respectively.

* * * * *